June 11, 1957 — F. M. OLEKSY — 2,795,251
COPING SAW
Filed Aug. 14, 1956
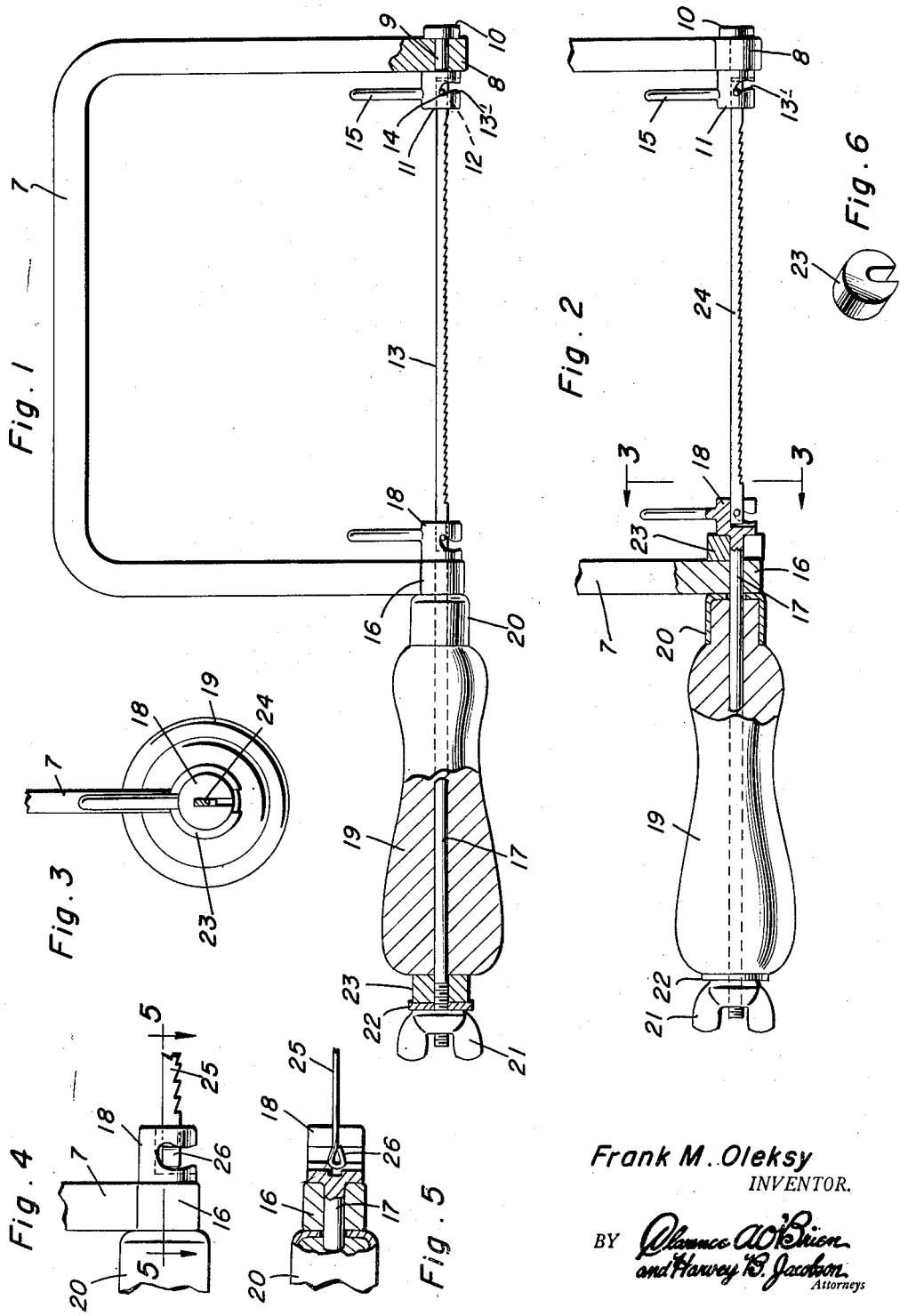
Frank M. Oleksy
INVENTOR.

United States Patent Office 2,795,251
Patented June 11, 1957

2,795,251

COPING SAW

Frank M. Oleksy, Charlevoix, Mich.

Application August 14, 1956, Serial No. 603,965

1 Claim. (Cl. 145—33)

The present invention relates to new and useful improvements in coping saws and has for its primary object to provide, in a manner as hereinafter set forth, a saw of this character which will readily accommodate blades of various lengths and types.

Other objects of the invention are to provide an adjustable coping saw of the character described which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawing forming a part thereof, wherein like numerals refer to like parts throughout, and in which:

Figure 1 is a view in side elevation, partially in section, of a coping saw embodying the present invention with a long blade mounted therein;

Figure 2 is a fragmentary view, partially in side elevation and partially in section, showing the saw with a short blade mounted therein;

Figure 3 is a view in transverse section, taken substantially on line 3—3 of Figure 2;

Figure 4 is a fragmentary view in side elevation, showing another type of blade mounted in the saw;

Figure 5 is a view in horizontal section, taken substantially on line 5—5 of Figure 4; and Figure 6 is a detail view in perspective of the spacing collar.

Referring now to the drawing in detail, it will be seen that the embodiment of the invention which has been illustrated comprises a substantially U-shaped frame 7 of suitable metal. Journaled in a bearing 8 provided therefor in the forward end portion of the frame 7 is a shaft 9. An anchoring head 10 is provided on the forward end of the shaft 9 for engagement with the frame 7. Fixed on the inner or rear end of the shaft 9 is a cylindrical head 11. The head 11 has formed longitudinally therein a groove or channel 12 for the reception of one end portion of a conventional blade 13. Formed transversely in the head 11 is an upwardly and rearwardly curved slot 13' for the reception of one of the usual transverse pins 14 of the blade 13. The groove 12 intersects the slot 13. A turning handle 15 rises from the head 11.

Journaled in a bearing 16 provided therefor on the rear end of the frame 7 is a relatively long shaft 17. The shaft 17 is also slidable in the bearing 16 and has fixed on its forward end a cylindrical head 18 which is substantially similar to the head 11.

An elongated handle 19 is slidably mounted on the shaft 17 rearwardly of the frame 7. The handle 19 comprises, on its forward end, a ferrule 20 which abuts the rear end portion of the frame 7. Threaded on the rear end portion of the shaft 17 is a wing nut 21. A washer 22 is also mounted on the shaft 17 forwardly of the wing nut 21.

Also mounted on the shaft 17 is a split or substantially U-shaped removable spacing collar 23. The collar 23 is selectively insertable between the washer 22 and the handle 19 or between the head 18 and the rear end portion of the frame 7. As seen in Figure 1 of the drawing, when a long blade 13 is mounted in the saw, the collar 23 is mounted on the shaft 17 between the handle 19 and the washer 22, after which the wing nut 21 is tightened for tensioning said blade 13 in an obvious manner. With the collar 23 in this position, the turns of the wing nut 21 for tightening the blade 13 are greatly reduced in number and loss of said collar is prevented. When a relatively short blade, as indicated at 24, is to be used, the wing nut 21 is loosened to permit removal of the collar 23, the shaft 17 is slid forwardly in its bearing 16 and said collar is inserted between the head 18 and the rear end portion of the frame 7. The rear end of the short blade 24 is then attached to the head 18 and the wing nut 21 is again tightened for tensioning said blade.

In Figures 4 and 5 of the drawing, reference character 25 designates a blade of the type comprising end hooks or loops 26. The grooves or channels 12 and the slots 13 in the heads 11 and 18 are formed to accommodate the hooks or loops 26 as well as the pins of the blades 13 and 24.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

An adjustable coping saw of the character described comprising: a substantially U-shaped frame, a shaft rotatably and slidably mounted on one end portion of said frame, a head on one end of said shaft for connection with one end of a saw blade, means for connecting the other end of the blade to the other end portion of the frame, an elongated handle rotatably and slidably mounted on the shaft and having one end in abutting engagement with said one end portion of said frame, a nut threaded on the shaft and engaged with the handle for actuating said shaft for tightening the blade, and a spacing collar removably mounted on the shaft and insertable selectively between the nut and the handle or between said one end portion of the frame and said head.

References Cited in the file of this patent

UNITED STATES PATENTS

| | | |
|---|---|---|
| 962,535 | Sigoloff | June 28, 1910 |
| 1,395,511 | Morgan | Nov. 1, 1921 |
| 1,665,317 | Maxson | Apr. 10, 1928 |
| 2,383,871 | McNeely | Aug. 28, 1945 |
| 2,654,404 | Neuhauser et al. | Oct. 6, 1953 |